(12) United States Patent
Griffith et al.

(10) Patent No.: US 9,933,829 B2
(45) Date of Patent: Apr. 3, 2018

(54) METHODS AND SYSTEMS FOR SERVER POWER LINE COMMUNICATION

(71) Applicant: INTEL CORPORATION, Santa Clara, CA (US)

(72) Inventors: Brian J. Griffith, Auburn, WA (US); Viktor D. Vogman, Olympia, WA (US); Justin J. Song, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/258,803

(22) Filed: Sep. 7, 2016

(65) Prior Publication Data

US 2016/0380675 A1    Dec. 29, 2016

Related U.S. Application Data

(63) Continuation of application No. 14/319,485, filed on Jun. 30, 2014, now Pat. No. 9,461,709.

(51) Int. Cl.
*G06F 1/32* (2006.01)
*G06F 1/26* (2006.01)
*H04B 3/54* (2006.01)
*H04H 20/38* (2008.01)
(Continued)

(52) U.S. Cl.
CPC .............. *G06F 1/3206* (2013.01); *G06F 1/26* (2013.01); *G06F 1/3209* (2013.01); *H04B 3/546* (2013.01); *H04B 3/548* (2013.01); *H04B 3/56* (2013.01); *H04H 20/38* (2013.01); *H04L 47/50* (2013.01); *H04B 2203/547* (2013.01);
(Continued)

(58) Field of Classification Search
CPC ........ G06F 1/3206; G06F 1/3209; G06F 1/26; H04B 3/548; H04B 3/546; H04H 20/30
See application file for complete search history.

(56) References Cited

U.S. PATENT DOCUMENTS 3,688,051 A   8/1972   Aagaard
5,283,572 A   2/1994   McClelland et al.
5,303,591 A   4/1994   Dykes et al.
(Continued)

OTHER PUBLICATIONS

U.S. Appl. No. 14/319,485, Non-Final Office Action, dated Apr. 11, 2016, 40 pages.

(Continued)

*Primary Examiner* — Stefan Stoynov
(74) *Attorney, Agent, or Firm* — Stoel Rives LLP

(57) ABSTRACT

A server system includes a common power bus, a power supply to provide direct current (DC) power through the common power bus, at least one node including a processor to receive the DC power through the common power bus, a transmitter capacitive coupled to the common power bus to transmit a power information signal from the power supply through the common power bus, and at least one receiver capacitive coupled to the common power bus to receive the power information signal transmitted by the transmitter and to provide the received power information signal to the at least one node. A plurality of buffers respectively coupled between the common power bus and each of the power supply and the at least one node provide path separation for high frequency and low frequency currents.

12 Claims, 6 Drawing Sheets

(51) Int. Cl.
*H04B 3/56* (2006.01)
*H04L 12/863* (2013.01)

(52) U.S. Cl.
CPC ............... *H04B 2203/5483* (2013.01); *H04B 2203/5495* (2013.01); *Y04S 40/146* (2013.01)

(56) References Cited

U.S. PATENT DOCUMENTS

| | | | |
|---|---|---|---|
| 5,490,053 | A | 2/1996 | Tkacenko et al. |
| 5,986,539 | A | 11/1999 | Johansson et al. |
| 7,286,026 | B2 | 10/2007 | Law |
| 8,843,772 | B2 * | 9/2014 | Hormuth .................. G06F 1/28 713/300 |
| 8,868,936 | B2 * | 10/2014 | Nelluri .................. G06F 1/3203 713/300 |
| 9,223,394 | B2 | 12/2015 | Kuan et al. |
| 2003/0007374 | A1 | 1/2003 | Winter |
| 2009/0019202 | A1 * | 1/2009 | Shetty ...................... G06F 1/26 710/116 |
| 2010/0169690 | A1 | 7/2010 | Mundada et al. |
| 2011/0078479 | A1 | 3/2011 | Vogman |
| 2012/0195355 | A1 | 8/2012 | El-Essawy et al. |
| 2012/0212251 | A1 | 8/2012 | Yanagishima et al. |
| 2013/0022135 | A1 | 1/2013 | Mouri et al. |
| 2013/0313902 | A1 | 11/2013 | Sako et al. |
| 2014/0001871 | A1 | 1/2014 | Vogman et al. |
| 2014/0035375 | A1 | 2/2014 | Vogman |
| 2014/0163701 | A1 | 6/2014 | Hashimoto |
| 2014/0208136 | A1 | 7/2014 | Rahardjo et al. |

OTHER PUBLICATIONS

U.S. Appl. No. 14/319,485, Notice of Allowance, dated Jun. 15, 2016, 8 pages.
U.S. Appl. No. 14/319,485, Non-Final Office Action, dated Mar. 19, 2015, 41 pages.
Silver, et al., "The ARRL Handbook for Radio Communications", AARL, 88th Edition, 2011, 3 pages.
Gilmore, "Practical Gamma-ray Spectrometry", Wiley, Second Ed., 2008, pp. 71-72.

\* cited by examiner

METHODS AND SYSTEMS FOR SERVER POWER LINE COMMUNICATION

RELATED APPLICATION

This application is a continuation of U.S. patent application Ser. No. 14/319,485, filed Jun. 30, 2014, which is hereby incorporated by reference herein in its entirety.

TECHNICAL FIELD

This disclosure generally relates to power supplies for servers and other computing devices and, more particularly, to communication and power management in a multi-node system.

BACKGROUND

Server systems having redundant power arrangements may incorporate two or more power supply modules that are configured to continuously supply maximum power to the system when either an alternating current (AC) power source or one of the modules fails. For example, if the peak workload power consumed from a conventional redundant power subsystem containing two power modules is $P_{MAX}$, each of the modules may typically be rated at $P_{MAX}$ or greater to maintain system operation when a failure occurs.

Power supplies are typically sized larger to deliver the maximum power $P_{MAX}$ that the system may need. However, since systems are not often used to capacity, a smaller power supply may detect an abnormal condition and generate an interrupt to signal the servers to throttle back until the power comes back into an acceptable range.

DETAILED DESCRIPTION OF EMBODIMENTS

Figure 1:
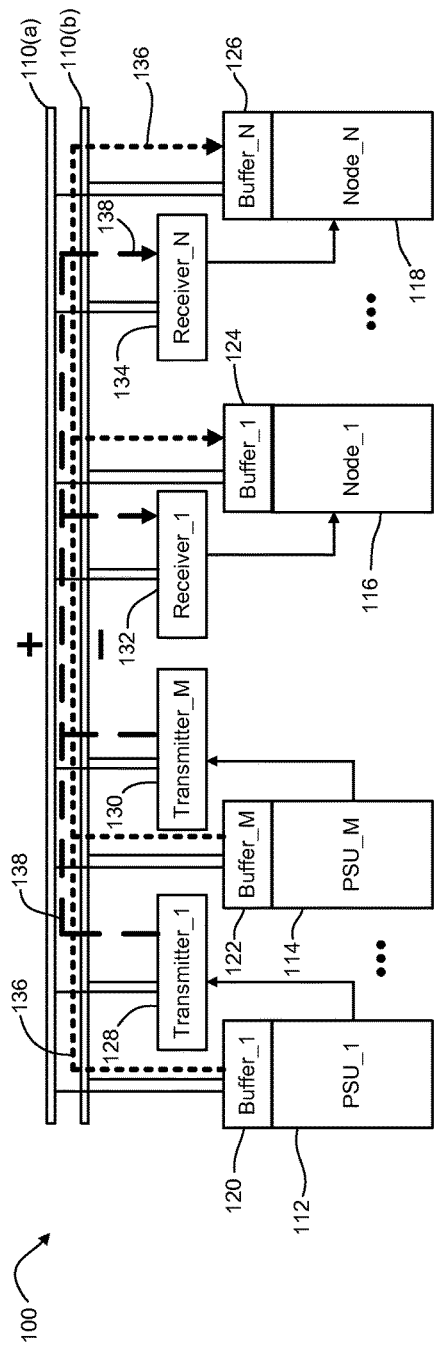
FIG. 1 is a block diagram illustrating a server system according to one embodiment.

In existing server systems, and in server racks specifically, the power supply is sized for full system (or rack) configuration running the platform's highest power software. This results in larger power supply size and/or wattage rating and higher server rack cost. In high density systems, it significantly limits the available board space and system configurations. At the same time, in real applications system utilization remains at about 20-25% level, and the power supply is loaded to a small portion of its power rating. For redundant power supply configurations, where at least two power supplies share a common load, average (typical) power supply load additionally drops by a factor of two.

As discussed above, a power specification for a computer system, $P_{MAX}$, usually defines maximum power capability of the power supply in the system. In the process of determining a value of $P_{MAX}$, system designers usually consider the worst-case configuration of a system. Thus, $P_{MAX}$ for a system represents power consumption when the system is fully populated with hardware. The determination of $P_{MAX}$ also assumes that the system is configured with the most power hungry components capable of being used in that configuration, and that the system is running the platform's highest power software that causes forces it to consume maximum power.

The present methods for determining $P_{MAX}$ suffer from various disadvantages. Most systems are populated with less hardware components than their capacity. Further, in the vast majority of cases, not all the components used are the most power hungry. For example, many systems may be using slower processors that usually consume less power, and the central processing unit (CPU) utilization is infrequently being used to 100% capacity. On average, many systems consume power far lower than $P_{MAX}$, and hence could function adequately and more efficiently with a smaller power supply.

Because of the low utilization rate and recent trend in idle power reduction, rack power supplies and AC feeds supplying power to multiple racks are oversized, operate at low power levels, and therefore have comparatively low efficiency and low power factor. This opens the opportunity for significant power supply size and cost reduction, without affecting system performance, and for improvement in system performance-per-watt score.

Certain embodiments disclosed herein provide fast and reliable throttling of servers or other processors and network devices to allow for using power supplies with continuous power ratings much lower than $P_{MAX}$.

In one embodiment, a method and apparatus for server rack power line communication is used for broadcasting electrical signals between rack power supplies and multiple nodes receiving direct current (DC) power through common bus bars. The method and apparatus may be used to provide communication between power supplies and nodes in place of utilizing a conventional separate daisy chain wiring. Existing solutions employing a separate daisy chain wiring are expensive and unreliable due to lack of redundancy. For example, opening any connection in the daisy chain cable may result in loss of key rack features such as overpower protection, power supply module management, or an ability to ride through AC line voltage dropouts. Opening a connection in the daisy chain may also decrease system availability due to the possibility of the nodes crashing when the power subsystem is overloaded.

One embodiment of server power line communication includes capacitive coupled transmitters, capacitive coupled receivers, and inductors on outputs of power supplies and on inputs of nodes (e.g., servers or other network devices). The server power line communication provides low power level broadcasting of electrical interrupt and serial communication signals between rack level shared power supplies and multiple nodes receiving DC power from these power supplies. The signal broadcasting is provided with very small size, low cost transmitters over the same bus bars that deliver high DC power to the nodes.

In another embodiment, systems and methods provide power capping and fast power protection at a server rack level. While conventional methods to protect the power at the node level use power capping and/or power throttling, conventional methods do not provide the same protection at the rack level so as to protect a large shared power supply or to cap power based on measured rack level power. Thus, in certain embodiments disclosed herein with large power supplies that provide power to a plurality of nodes, the power supplies are used as sensors to provide both fast protection against abnormal conditions and slower power capping to control average power consumption. The power supplies, along with control features at the nodes, provide reliable protection for both the DC power out of the power supplies and the AC power feeding the rack.

I. Server Power Line Communication

FIG. 1 is a block diagram illustrating a server system 100 according to one embodiment. The server system 100 may be referred to herein as a "server rack," or simply "rack." The server system 100 includes high DC power bus bars 110(*a*), 110(*b*) electrically coupled to M number of rack power supply units (PSUs) 112, 114 (two shown as PSU_1 . . . PSU_M) and N number of nodes 116, 118 (two shown as Node_1 . . . Node_N). Persons skilled in the art will recognize that M may represent any number of PSUs and N may represent any number of nodes, and that M and N may or may not be the same number. In this example embodiment, each node 116, 118 includes a server. However, the disclosure is not so limited, and in certain embodiments the nodes 116, 118 may include a server, computer, network device, processor, combinations of the foregoing, or any other component that is configured to receive power through the power bus bars 110(*a*), 110(*b*) from one or more of the PSUs 112, 114.

A power output of each PSU 112, 114 and a power input of each node 116, 118 is connected to the high DC power bus bars 110(*a*), 110(*b*) (also referred to herein as a common power bus) through respective buffers 120, 122, 124, 126. Each PSU 112, 114 is also electrically coupled to a respective transmitter 128, 130, and each node 116, 118 is also electrically coupled to a respective receiver 132, 134. The transmitters 128, 130 and receivers 132, 134 are each electrically coupled to the power bus bars 110(*a*), 110(*b*) for transmitting an interrupt alert signal from the PSUs 112, 114 to the nodes 116, 118. Skilled persons will recognize from the disclosure herein that the transmitters may be internal or external to the physical design of the PSUs, and that the receivers may be internal or external to the physical design of the nodes.

FIG. 1 graphically represents the flow of high DC power 136 and power information signals 138 through the power bus bars 110(*a*), 110(*b*). The PSUs 112, 114 may be part of a rack power subsystem that generates the high DC power 136 (dotted line), which is output through the buffers 120, 122 to the power bus bars 110(*a*), 110(*b*) and input through the buffers 124, 126 to the nodes 116, 118.

Each buffer 120, 122, 124, 126 includes an inductor (not shown) configured to separate paths for high frequency and low frequency (e.g., DC) currents and to provide high frequency insulation for transmitter outputs and receiver inputs from very low impedance PSU outputs and node power inputs. The buffers 120, 122, 124, 126 provide low pass filtering so that the PSUs 112, 114 can provide the high DC power 136 to the nodes 116, 118 without interference from the interrupt signals 138 on the same power bus bars 110(*a*), 110(*b*). In addition to signal separation and guiding features, the buffers 120, 122, 124, 126 help to keep the voltage of the power bus bars 110(*a*), 110(*b*) within a regulation range by limiting the current drawn from the power bus bars 110(*a*), 110(*b*) under node fault condition. This is useful, for example, when a hot swap circuit isolates a faulty node from the power line.

Although not shown in FIG. 1, the PSUs 112, 114 may include AC fault detectors, DC fault detectors, and/or other sensors that assert an alert signal, e.g., a system management bus alert signal (SMBAlert#). When an abnormal condition occurs in the power subsystem (e.g., over temperature, overcurrent, or momentary AC loss), and a corresponding alert signal is generated on any of the PSU alert outputs, the corresponding transmitter 128, 130 transmits the alert signal over the power bus bars 110(*a*), 110(*b*). The buffers 120, 122, 124, 126 "navigate" the alert signal directly to the receiver inputs where it is detected by alert detectors within the receivers 132, 134. A node manager or programmable logic device (PLD) on the nodes' baseboards respond to the detected alert signal by throttling the CPU and/or memory in each node 116, 118, which provides power subsystem load reduction and protects the AC feeds from overloading, the PSUs 112, 114 from shutting down and the nodes 116, 118 from crashing.

Figure 2:
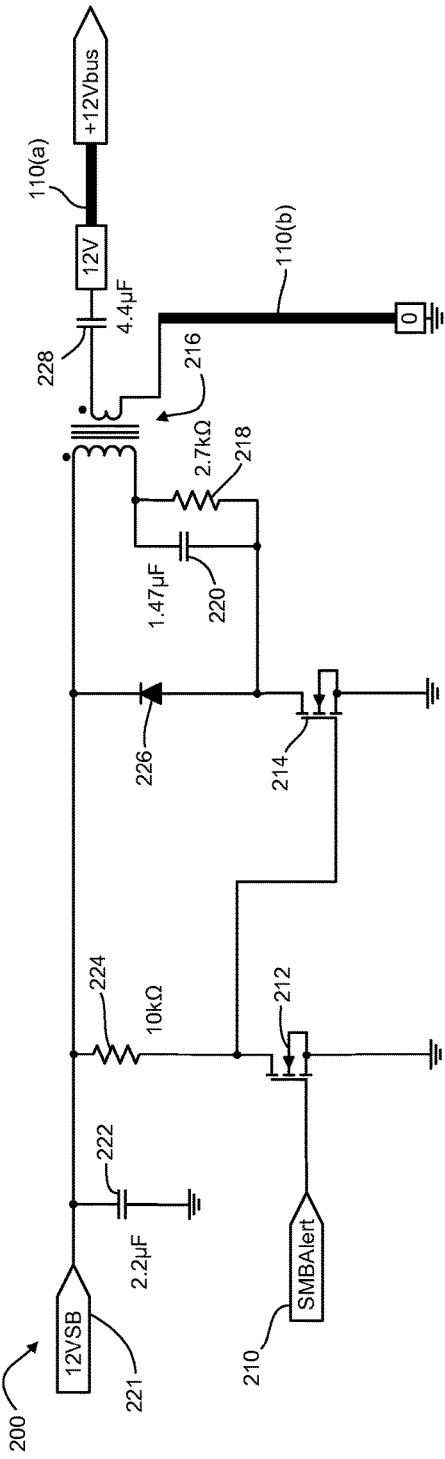
FIG. 2 is a schematic diagram of a transmitter according to one embodiment.

FIG. 2 is a schematic diagram of a transmitter 200 according to one embodiment. The particular implementation (including the capacitances, resistances, and other component values) of the transmitter 200 shown in FIG. 2 is provided by way of example and persons skilled in the art will recognize that many other designs or modifications may be used. The transmitter 200 may be used, for example, for the transmitters 128, 130 shown in FIG. 1.

The transmitter 200 receives an alert signal 210 (SMBAlert) from, for example, any of the PSUs 112, 114 shown in FIG. 1. The alert signal 210 is inverted and amplified by two transistors 212, 214 (e.g., metal-oxide-semiconductor filed-effect transistors or MOSFETs) and fed to a first connection of a primary winding of a step-down pulse transformer 216 through a resistor-capacitor (RC) circuit including a resistor 218 and a capacitor 220. A second connection of a primary winding of the step-down pulse transformer 216 is electrically coupled to a 12 V standby voltage 221 (12VSB), which may be low-pass filtered with a capacitor 222. The transistor 212 is pulled up to 12VSB through a resistor 224, and the transistor 214 is pulled up to 12VSB through a diode 226.

A secondary winding of the transformer 216 is connected to the supplying power bus bars 110(*a*), 110(*b*) through a DC blocking capacitor 228. The capacitor 228 is connected in series between the secondary winding and a +12Vbus high power of the bus bars so as to be a high-pass filter that allows the alert signal 210 to be transmitted to the power bus bars 110(*a*), 110(*b*), while preventing the high DC power of the power bus bars from propagating inside the transmitter 200. The step-down transformer 216 reduces a peak power required for transmission through the power bus bars 110(*a*), 110(*b*).

In certain embodiments, the alert signal 210 may be asserted for more than 100 milliseconds, or even for a few seconds. Because larger transformers are generally required for lower frequency (longer duration) signals than those used for higher frequency (shorter duration) signals, providing the alert signal 210 directly to the primary winding of the transformer 216 would increase the size and cost of the transmitter 200. Thus, to reduce the size of the transformer 216, the RC circuit formed by the resistor 218 and the capacitor 220 shortens the transmitted pulse duration of the alert signal 210 to several microseconds (e.g., about 1 μsec to about 4 μsec). Skilled persons will recognize from the disclosure herein that in other embodiments the shortened pulse duration may be less than 1 μsec or greater than 4 μsec.

Figure 3:
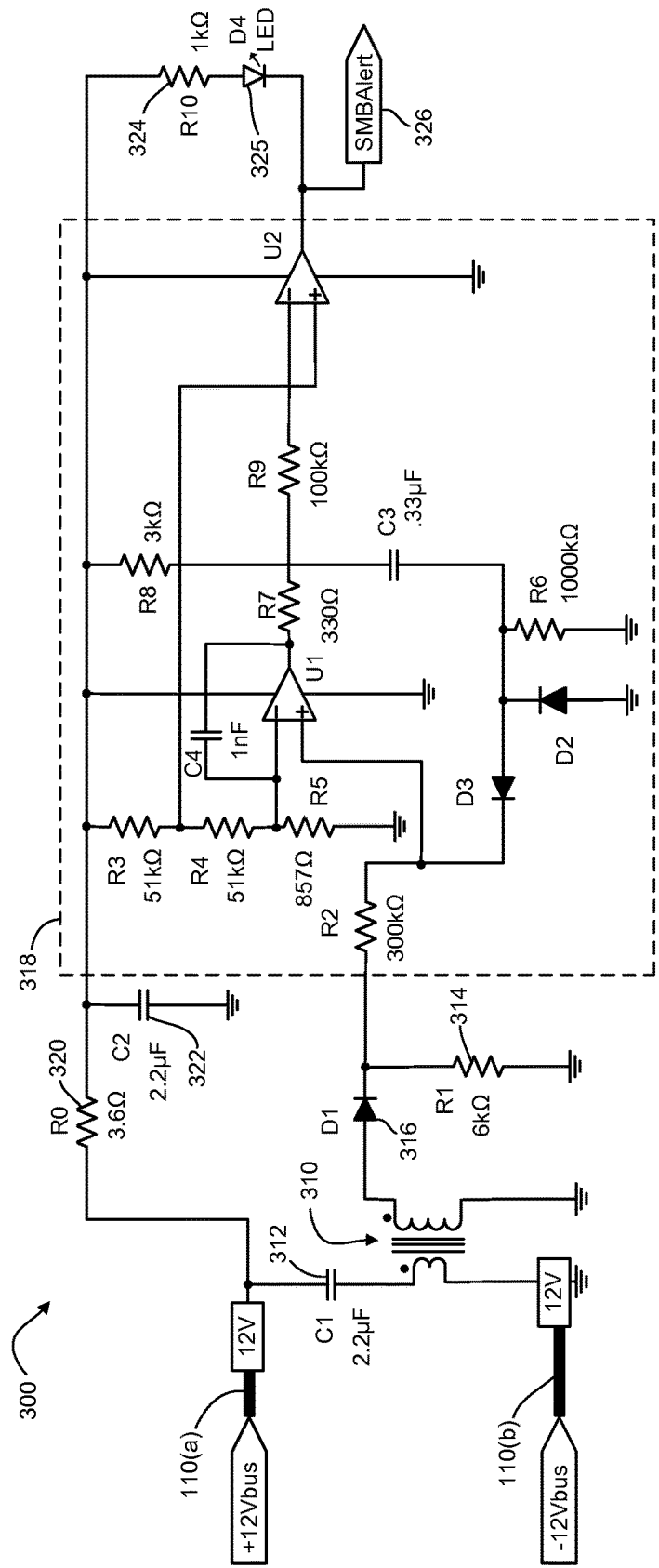
FIG. 3 is a schematic diagram of a receiver according to one embodiment.

FIG. 3 is a schematic diagram of a receiver 300 according to one embodiment. The particular implementation (including the capacitances, resistances, and other component values) of the receiver 300 shown in FIG. 3 is provided by way of example and persons skilled in the art will recognize that many other designs or modifications may be used. The receiver 300 may be used, for example, for the receivers 132, 134 shown in FIG. 1.

The receiver 300 receives the transmitted signal (e.g., the alert signal from the transmitter 200 shown in FIG. 2) with a step-up pulse transformer 310 having a primary winding coupled to the power bus bars 110(a), 110(b) through a DC blocking capacitor 312 (C1). The capacitor 312 acts as a high-pass filter that allows the high frequency alert signal to be detected, while preventing the high DC power of the power bus bars 110(a), 110(b) from propagating inside the receiver 300.

In this example, the transformer 310 is used in combination with a termination resistor 314 (R1) to act as a current transformer (e.g., a step-up pulse transformer) representing very low impedance for the alert signal on its primary side. The transformer 310 restores (i.e., detects) the pulse DC component on its secondary side by a diode 316 (D1), which is coupled to comparator circuitry 318. A low-pass filter including a resistor 320 (R0) and a capacitor 322 (C2) is coupled to the +12Vbus side of the power bus bar 110(a) to provide power to the comparator circuitry. In some embodiments, the receiver 300 includes an optional resistor 324 (R10) and light emitting diode 325 (D4) to provide visual indication of the received signal.

The comparator circuitry 118 is provided by way of example and includes a plurality of operational amplifiers (U1, U2), resistors (R3, R4, R5, R6, R7, R8, R9), capacitors (C3, C4), and diodes (D2, D3) configured to amplify and invert the detected alert signal. The comparator circuitry 318 also acts as a single shot element extending the received voltage pulse to several hundred milliseconds at an output of the alert signal 326, which may be used to throttle the node's CPU and/or memory for a sufficient time. The pulse duration of the output alert signal 326 may depend on the particular application (e.g., it may be more than several hundred milliseconds). In certain embodiments, the output alert signal 326 is provided to a node manager that controls throttling, power capping, and/or other power functions. In other embodiments, the output alert signal 326 allows the node to provide power and/or memory throttling, while bypassing the node manager.

Figure 4:
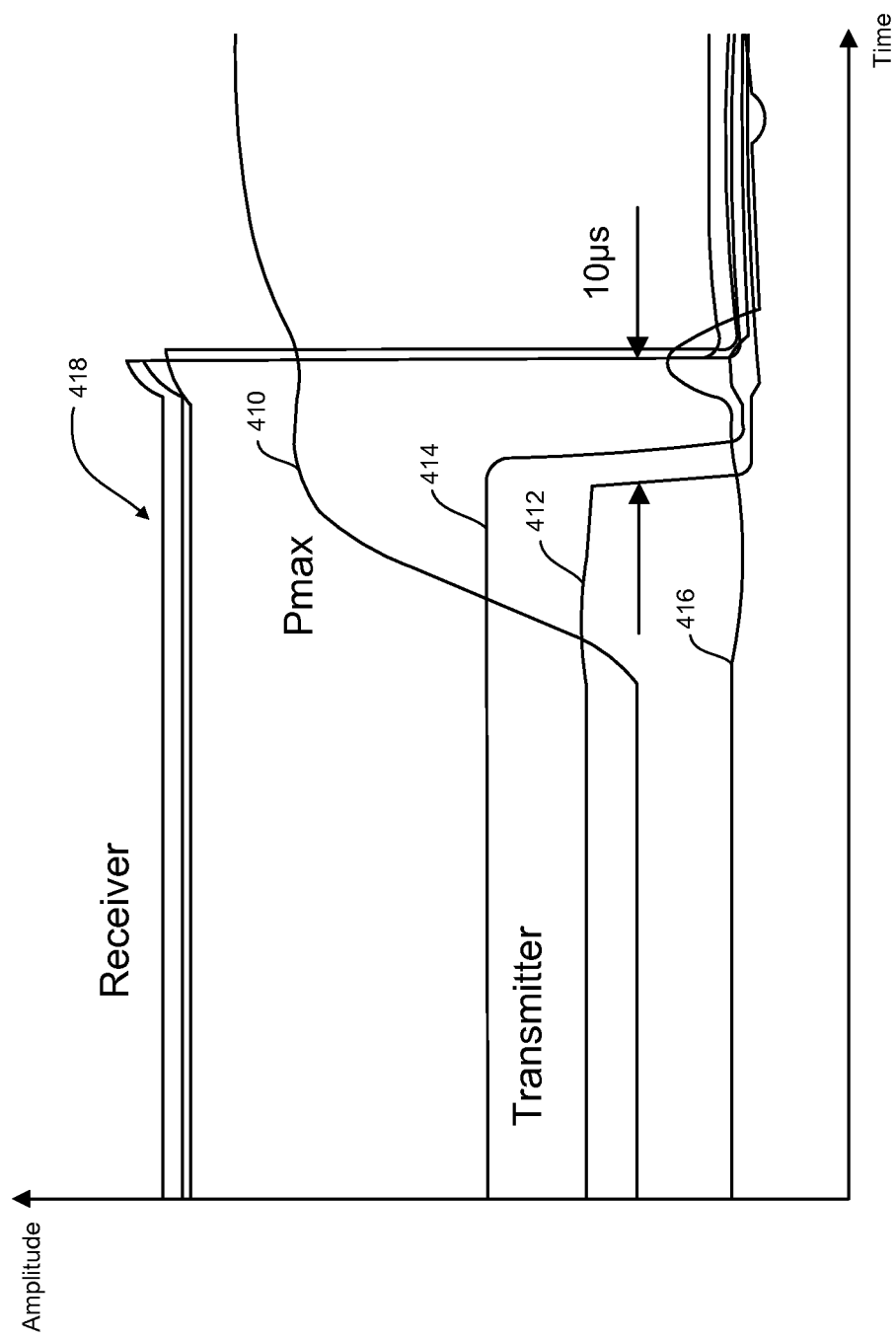
FIG. 4 is a timing diagram representing power line communication waveforms according to one embodiment.

FIG. 4 is a timing diagram representing power line communication waveforms according to one embodiment. The waveforms illustrate an example operation of the transmitter 200 shown in FIG. 2 and the receiver 300 shown in FIG. 3. As shown in FIG. 4, a waveform 410 represents PSU current or power that is consumed by one or more nodes. As the consumed power increases to a threshold associated with a maximum power $P_{MAX}$, a PSU alert signal, represented by a waveform 412, is asserted at the input of the transmitter (see alert signal 210 in FIG. 2). Waveform 414 represents the alert signal amplified by the transmitter (i.e., representing the voltage across the MOSFET transistor 214 in FIG. 2). Waveform 416 represents the alert signal detected by the receiver (i.e., representing the current through the resistor 314 in FIG. 3. Waveforms 418 (three shown) represent the output signal (i.e., the output alert signal 326 in FIG. 3) of the receivers connected to the bus bars.

Once the power (see waveform 410) crosses the threshold, the alert signal applied to the transmitter is asserted, as shown by a step change in the waveform 412. The transmitter communicates the amplified alert signal (see waveform 414) over bus bars with some delay. As shown in FIG. 4, the receiver's output signal (see waveform 418) in this example is delayed from the initial alert signal's falling edge by about 10 μsec. In certain such embodiments, this delay does not exceed 10% of the time delay reserved for CPU response to the alert.

Thus, certain embodiments disclosed herein provide a method to interface power line communication into a low impedance DC power distribution path and to provide an interrupt signal, such as an SMBSAlert signal, over this same path. In addition, or in other embodiments, serial communication between PSUs and nodes may also be provided over the high DC power bus bars. For example, certain embodiments may transmit power management bus (PMBus) signals over low impedance, high DC power bus bars.

The disclosed embodiments for server power line communication improve system reliability and energy efficiency, support redundant power line communication, and reduce server power supply size and cost. As mentioned above and described in the next section, systems and methods according to certain example embodiments also provide power capping and fast power protection at the server rack level.

II. Example Embodiments of Rack Level Power Protection and Capping

Certain embodiments disclosed herein include large, shared power supplies that provide power to a plurality of nodes. The power supplies are used as sensors to provide both fast protection against abnormal conditions and slower power capping to control average power consumption. The power supplies, along with control features at the nodes, provide reliable protection for both the DC power out of the power supplies and the AC power feeding the rack.

While conventional methods to protect the power at the node level use power capping and/or power throttling, conventional methods do not provide the same protection at the rack level so as to protect a large shared power supply or to cap power based on measured rack level power.

Figure 5:
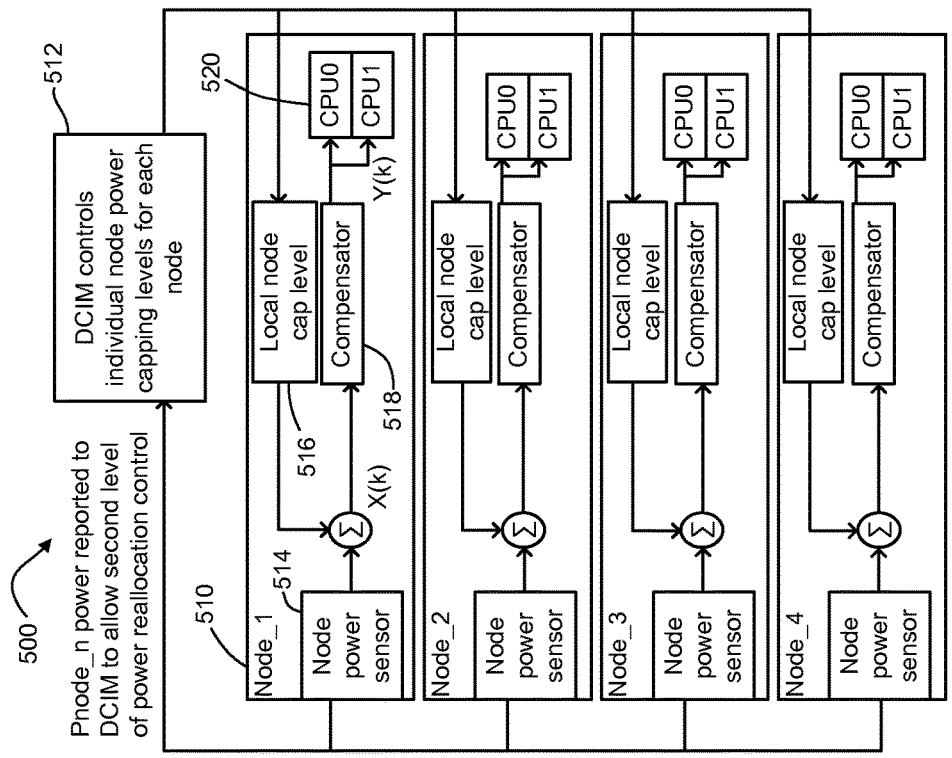
FIG. 5 is a block diagram of an example system using a control process at the node level and a control process at a facility DCIM level to protect rack level power supplies.

For example, FIG. 5 is a block diagram of a system 500 using a control process at the node 510 level and a control process at the facility data center infrastructure management (DCIM) 512 level to protect rack level power supplies. Each node 510 (four shown as Node_1, Node_2, Node_3, and Node_4) includes a node power sensor 514 that reports local AC power (shown as Pnode_n power) to the DCIM 512. The control process at the DCIM 512 allocates power for each individual node. The DCIM 512 controls individual node power capping levels. Each node 510 then controls its local power capping by summing its local node cap level 516 (individually allocated by the DCIM 512) with the output of its local node power sensor 514 to produce an error signal X(k). A compensator 518 in each node 510 receives the error signal X(k) and generates a control signal Y(k) provided to one or more CPUs 520 (two shown as CPU0 and CPU1), which limit the power of the node 510.

The system 500 shown in FIG. 5, however, may have disadvantages. For example, power on an individual node 510 may sometimes be unnecessarily limited until the DCIM 512 level control can reallocate a power cap level for the nodes in the rack. Further, there is a limit for scaling the solution to many racks and nodes because one central DCIM 512 controls each node power cap level.

Thus, certain embodiments disclosed herein provide a system to protect and throttle performance only when the rack level power is exceeded. Such embodiments avoid any momentary and/or unnecessary node level performance throttling. The disclosed systems and methods also limit the period of time that nodes experience unnecessary throttling to a minimum of the speed of a single control loop.

By way of example, certain embodiments may be used to improve rack level power capping control in the case of a resource manager in a facility attempting to maintain a selected power level on a rack. The disclosed systems and methods allow the nodes in the rack to maintain the selected rack level power capping autonomously, without the need of another layer to manage the nodes in the rack through a reallocation process.

Figure 6:
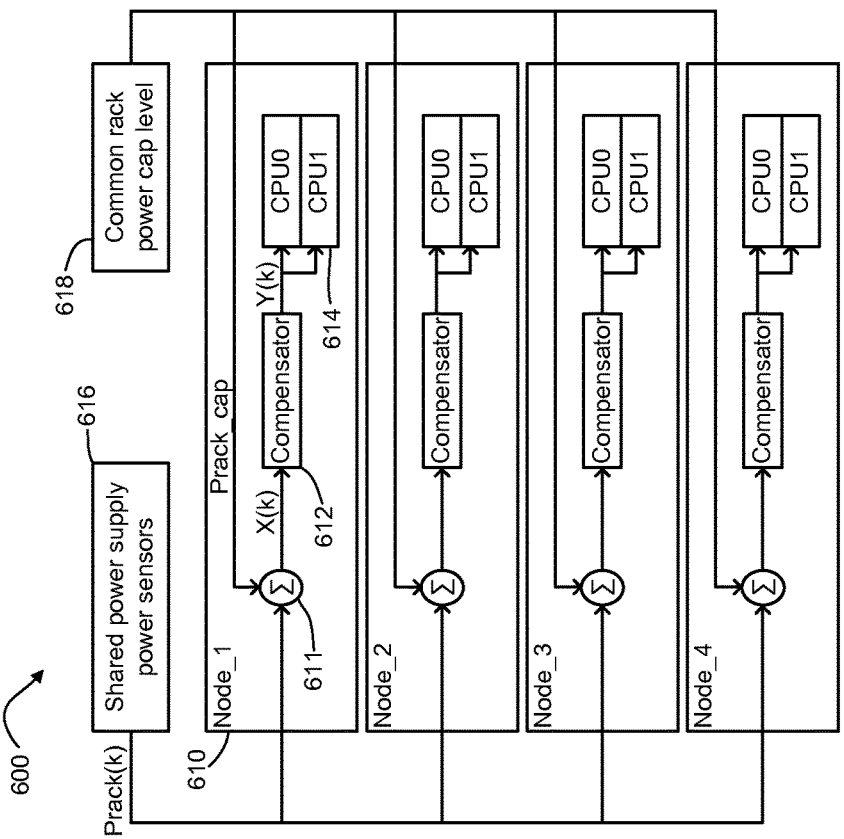
FIG. 6 is a block diagram of a system to provide rack level power protection and capping according to one embodiment.

FIG. 6 is a block diagram of a system 600 to provide rack level power protection and capping according to one embodiment. In this example, the system 600 includes four nodes 610 (shown as Node_1, Node_2, Node_3, and Node_4). However, persons skilled in the art will recognize that any number of nodes may be used. Each node 610 includes a summing element 611, a compensator 612, and one or more CPUs 614 (two shown as CPU0 and CPU1). The one or more CPUs 614 include circuitry and/or computer executable instructions to cap power. For example, the one or more CPUs 614 may include running average power limit (RAPL) modules to control or limit power usage based on a control signal Y(k) received from the compensator 612.

The system 600 further includes a shared power supply with input and/or output power sensors 616, which provide power feedback Prack(k) to each node 610. Persons skilled in the art will recognize that the shared power supply may include one or more power supplies and/or power sensors. The power sensors may include both AC and DC input power sensors and/or a DC output power sensor. A common rack power cap level 618 (shown as Prack_cap) is provided to each node 610 in the system. In certain embodiments, the shared power supply provides the common rack power cap level 618 to the nodes 610. The summing element 611 sums the shared power feedback Prack(k) and common rack power cap level Prack_cap to generate an error signal X(k) provided to the compensator 612. The output Y(k) of the compensator 614 is provided to the one or more CPUs 614 (e.g., to RAPL registers) to limit the power of the individual node 610, when needed to satisfy the overall rack power cap level.

Figure 7:
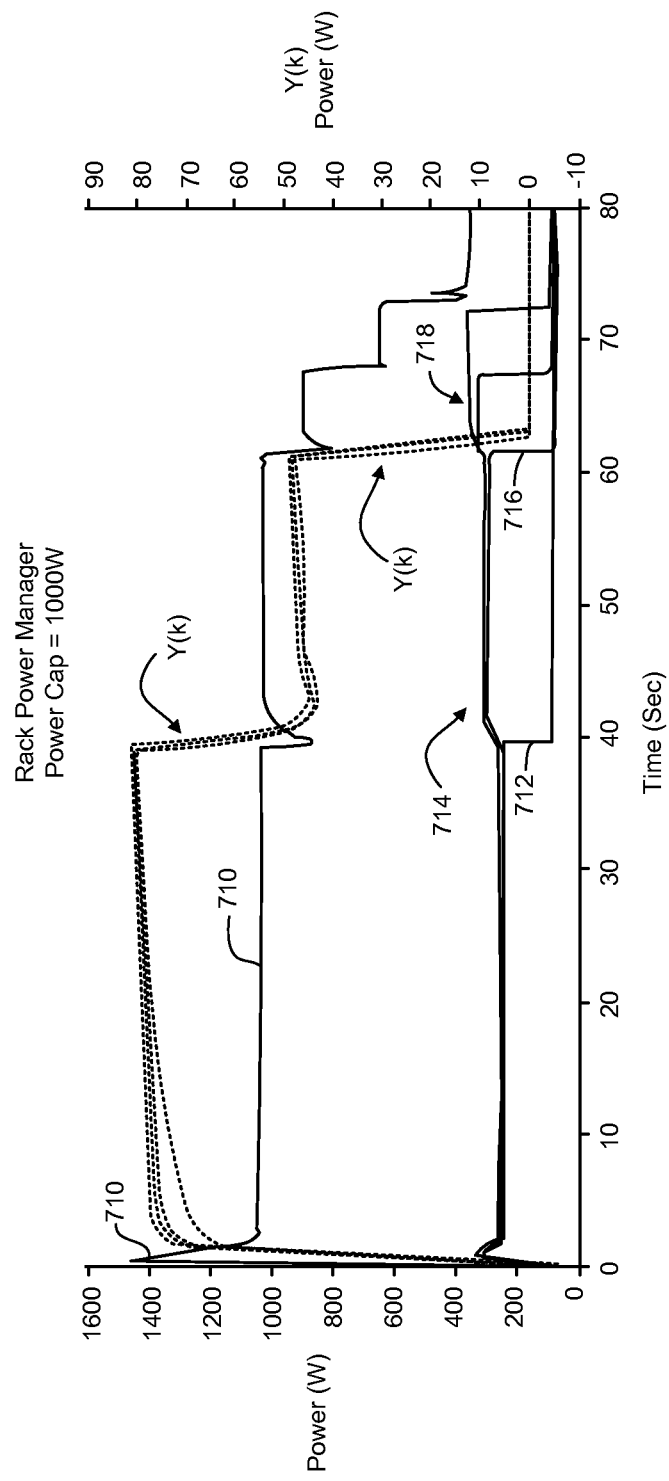
FIG. 7 is a timing diagram illustrating power waveforms generated in an example operation of the system shown in FIG. 6 according to one embodiment.

FIG. 7 is a timing diagram illustrating power waveforms generated in an example operation of the system 600 shown in FIG. 6 according to one embodiment. In this example, a rack power cap level Prack_cap of about 1000 W is applied to the shared power supply. As shown in FIG. 7, initial operation of all four nodes cause the shared rack power 710 to exceed the rack power cap level Prack_cap. Then, each node's control loop pulls the shared power back to the rack power cap level Prack_cap. To illustrate the operation of the system 600, a first node's power 712 is turned off or reduced at about 40 seconds. In response, each remaining node's compensator output Y(k) (shown with dashed lines) adjusts to allow higher power (as shown at 714), which results in high performance on the remaining nodes in use.

In this example, operation of the three remaining nodes continues to cause the shared rack power 710 to exceed the rack power cap level Prack_cap. Thus, each remaining node's control loop pulls the shared power back to the rack power cap level Prack_cap until a second node's power 716 is turned off or reduced. When the second node's power 716 is turned off or reduced, the local control loops no longer need to drive their Y(k) values to the CPU to limit power so as to stay within the rack power cap level Prack_cap limit. Thus, the control loop no longer limits power, the compensator outputs go to Y(k)=0, and the remaining two nodes are allowed to operate at a higher power (as shown at 718) and maximum performance without being limited to maintain the overall rack power cap.

Figure 8:
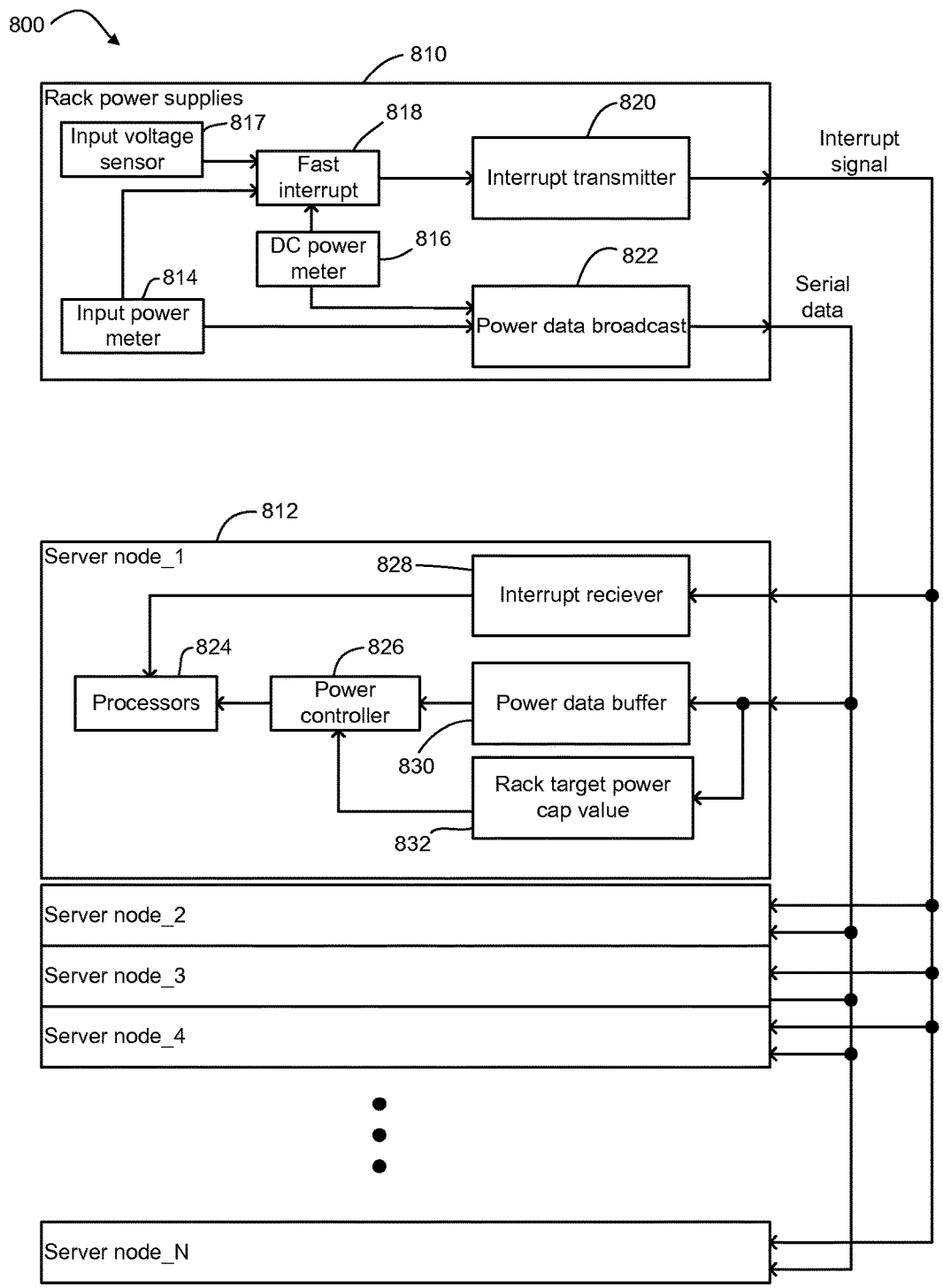
FIG. 8 is a block diagram of a system for rack level power protection and control according to one embodiment.

FIG. 8 is a block diagram of a system 800 for rack level power protection and control according to one embodiment. The system 800 includes rack power supplies 810 and a plurality of server nodes (shown as Server node_1, Server node_2, Server node_3, Server node_4, . . . , Server node_N). The rack power supplies 810 are shared among the plurality of server nodes 812. The rack power supplies 810 include sensors to provide power information to the plurality of server nodes 812 in the shared rack. The rack power supplies provide power information including, for example, interrupt signals to the plurality of server nodes 812 if a threshold in the power supply is exceeded, real time serial power meter data for AC or DC input power and/or DC output power broadcast to the powered server nodes 812, and rack level power target configuration serial data broadcast to the plurality of server nodes 812. In certain embodiments, the information from the rack power supplies 810 to the plurality of server nodes 812 is identical for each node. Thus, the information can be broadcast to the plurality of server nodes 812 at the same time, without the need of a master/slave handshake.

The rack power supplies 810 include an input power meter 814, a DC power meter 816, an input voltage sensor 817, a fast interrupt module 818, an interrupt transmitter 820, and a power data broadcast module 822. The input power meter 814 provides measured rack input power levels to the fast interrupt module 818 and to the power data broadcast module 822. The input power meter 814 may measure both AC and DC input power feeds. The DC power meter 816 provides measured PSU output DC power levels to the fast interrupt module 818 and to the power data broadcast module 822. The input voltage sensor 817 provides a signal to the fast interrupt module 818 when a loss of input voltage condition is detected.

The fast interrupt module 818 generates an interrupt signal, such as the alert signals (e.g., SMBAlert) discussed above, based on the measured rack input and the PSU DC output power levels. The fast interrupt module 818 may assert the interrupt signal to protect the rack power supplies 810, an input feed to the rack power supplies 810, and/or an energy backup system. For example, asserting the interrupt signal based on power supply output current protects the rack power supplies 810 from over current shutdown. Asserting the interrupt signal due to high AC current draw protects the circuit breakers, PDUs, and/or uninterruptible power supply (UPS) systems feeding the rack. Asserting the interrupt signal for loss of input voltage condition helps the smaller rack power supplies to ride through any momentary AC loss conditions.

The fast interrupt module 818 provides the interrupt signal to the interrupt transmitter 820 for communication to the plurality of server nodes 812. In certain embodiments, as discussed above, the interrupt transmitter 820 communicates the interrupt signal through high DC power bus bars to the plurality of server nodes 812. See, e.g., FIGS. 1 and 2. In certain such embodiments, a transmission time for the communication of the interrupt signal through the high DC power bus bars is in a range between about 10 μsec and about 20 μsec so as to initiate fast power throttling on the powered server nodes.

The power data broadcast module 822 communicates power information (e.g., measured input and PSU output DC power levels) as serial data from the rack power supplies 810 to the powered server nodes 812. The input power and output DC power may be sensed and reported over system management bus (SMBus) interface. However, this limits the number of nodes that can poll the PSUs, a slave device. Broadcasting the power data to the powered nodes at the same time allows all nodes to receive the shared power data (including real time input and/or output DC power) at the same rate.

Each of the plurality of server nodes 812 includes one or more processors 824, a power controller 826, an interrupt receiver 828, a power data buffer 830, and a rack target power cap value 832. The interrupt receiver 828 detects the power interrupt signal from the power supplies. In certain embodiments, as discussed above, the interrupt receiver 828 detects the interrupt signal through high DC power bus bars. See FIGS. 1 and 3. Upon detecting the interrupt signal, the interrupt receiver 828 asserts the processor's throttling pin and holds it for a predetermined period of time to provide fast power throttling that protects the power supplies, bulk energy storage, and input feeds.

The power data buffer 830 receives the real time power data transmitted by the rack power supplies 810 and saves it to a register or memory device. Each server node 812 can poll the register (e.g., via standard SMBus protocols) for reporting and control purposes.

When the rack power supplies 810 power on or when a user programs the power capping limit level of the rack, the serial data broadcast by the rack power supplies 810 includes configuration data with the rack target power cap value 832. Each server node 812 saves the rack target power cap value 832 so the power controller 826 can reference the data. In certain embodiments, the rack power cap value 832 may also be programmed by a DCIM element to control power to a different level than that reported by the shared PSUs.

The power controller 832 receives the rack level power sensor data from the power data buffer 830 and the rack target power cap value 832. The plurality of server nodes 812 act in parallel to implement a controller to maintain the rack level power via, for example, a proportional-integral-derivative (PID) control method or other control method. Thus, identical power controllers 826 in the plurality of server nodes 812 can maintain a rack level shared power target.

The disclosed systems and methods allow users to provide more processors in a rack while still maintaining protection reliability. Certain embodiments may be integrated into a node manager and related motherboard hardware to allow users to protect rack level, fit more components into the rack, and remove layers of expensive power sensors and DCIM software.

EXAMPLE EMBODIMENTS

The following examples pertain to further embodiments.

Example 1 is a server system including a common power bus, a power supply to provide direct current (DC) power through the common power bus, at least one node comprising a processor to receive the DC power through the common power bus, a transmitter capacitive coupled to the common power bus to transmit a power information signal from the power supply through the common power bus, and at least one receiver capacitive coupled to the common power bus to receive the power information signal transmitted by the transmitter. The at least one receiver also to provide the received power information signal to the at least one node. The example server system also includes a plurality of buffers respectively coupled between the common power bus and each of the power supply and the at least one node. The plurality of buffers to separate paths for high frequency and low frequency currents, and to provide high frequency insulation for the transmitter and the at least one receiver from low impedance connections of the power supply and the at least one node to the common power bus.

Example 2 includes the server system of Example 1, wherein the transmitter includes a DC blocking capacitor coupled to the common power bus, and circuitry to convert a first pulse having a first duration to a second pulse having a second duration. The second duration being less than the first duration. The transmitter also includes a transformer comprising a primary winding to receive the second pulse, and a secondary winding coupled to the DC blocking capacitor to transmit the second pulse through the common power bus.

Example 3 includes the server system of Example 2, wherein the transformer includes a step-down pulse transformer to reduce a peak power of the second pulse for transmission through the common power bus.

Example 4 includes the server system of Example 2, wherein the first duration is greater than 100 milliseconds, and wherein the second duration is less than 4 microseconds.

Example 5 includes the server system of Example 1, wherein the at least one receiver includes a DC blocking capacitor coupled to the common power bus, pulse detection circuitry coupled to a receiver output, and a transformer. The transformer includes a primary winding coupled to the DC blocking capacitor to receive a pulse from the common power bus, and a secondary winding coupled to the pulse detection circuitry.

Example 6 includes the server system of Example 5, wherein the at least one receiver further includes circuitry to extend a duration of the pulse received through the common power bus and detected by the pulse detection circuitry.

Example 7 includes the server system of Example 1, wherein the power information signal includes an alert signal to indicate an input fault condition or a DC output fault condition, and wherein the at least one node is configured to throttle one or more components to reduce power consumption in response to the alert signal.

Example 8 includes the server system of Example 1, wherein the power supply includes one or more power meters, and a fast interrupt module connected to the one or more power meters and configured to generate an interrupt signal based on power measurements provided by the one or more power meters. The fast interrupt module to provide the interrupt signal to the transmitter for transmission through the common power bus.

Example 9 includes the server system of Example 8, wherein the one or more power meters include an input power meter and a DC output power meter.

Example 10 includes the server system of Example 8, wherein the power supply further includes a power data broadcast module to broadcast serial data to the at least one node, the serial data including the power measurements provided by the one or more power meters and a common rack power cap level.

Example 11 includes the server system of Example 10, wherein the at least one node includes a power data buffer to store the power measurements, and a power controller. The power controller includes a summing element to generate an error signal based on a sum of the power measurements and the common rack power cap level, and a compensator to generate a control signal provided to the processor to limit power consumption based on the error signal.

Example 12 is a method that includes reducing a pulse width of an alert signal received from a power supply module, providing the alert signal through a first capacitive coupled transformer to a power bus, receiving the alert signal through a second capacitive coupled transformer from the power bus, and providing the received alert signal to a node powered through the power bus.

Example 13 includes the method of Example 12, and further includes, before providing the received alert signal to the node, extending the pulse width duration of the received alert signal.

Example 14 includes the method of Example 12, and further includes, in response to receiving the alert signal through the power bus, throttling one or more components of the node.

Example 15 includes the method of Example 12, and further includes buffering a direct current (DC) power input of the node to separate paths for high frequency and low frequency currents through the power bus.

Example 16 is a transmitter for communicating a power information signal through a low impedance power bus configured to provide power from a power supply unit to a node. The transmitter includes a DC blocking capacitor coupled to the power bus, and circuitry to convert a first pulse having a first duration to a second pulse having a second duration. The second duration being less than the first duration. The transmitter further includes a transformer that includes a primary winding to receive the second pulse, and a secondary winding coupled to the DC blocking capacitor to transmit the second pulse through the power bus.

Example 17 includes the transmitter of Example 16, wherein the transformer comprises a step-down pulse transformer to reduce a peak power of the second pulse for transmission through the power bus.

Example 18 includes the transmitter of Example 16, wherein the first duration is greater than 100 milliseconds, and wherein the second duration is less than 4 microseconds.

Example 19 is a method to control power in a server rack with a shared power supply. The method includes broadcasting a common rack power cap level to a plurality of server nodes, broadcasting a shared power feedback signal from the shared power supply to the plurality of server nodes, and determining at each of the plurality of server nodes a power error based on a difference between the common rack power level and the shared power feedback signal. The method also includes controlling, autonomously at each of the plurality of server nodes, a local power consumption based on the power error.

Example 20 includes the method of Example 19, and further includes operating the plurality of server nodes in parallel to maintain a rack power consumption level at or below the common rack power cap level.

Example 21 includes the method of Example 19, and further includes broadcasting shared power data from the shared power supply to the plurality of server nodes. The shared power data comprising measured input and direct current (DC) shared power supply output power levels.

Example 22 includes the method of Example 21, and further includes transmitting, from the shared power supply, the shared power data as serial data. The method further includes storing, at each of the plurality of server nodes, the shared power data received from the shared power supply in a power data buffer comprising a register configured to be polled by the plurality of server nodes.

Example 23 includes the method of Example 19, and further includes monitoring power information at the shared power supply, and based on the monitored power information, generating an interrupt signal. The method further includes transmitting the interrupt signal from the shared power supply to the plurality of server nodes through a common power bus.

Example 24 includes the method of Example 23, and further includes receiving, at the plurality of server nodes, the interrupt signal through the common power bus. The method further includes, in response to the interrupt signal, throttling the plurality of server nodes.

Example 25 is an apparatus comprising means to perform a method as recited in any one of Examples 19-24.

Example 26 is a system that includes a common power bus, a power supply to provide direct current (DC) power through the common power bus, and at least one node comprising a processor. The at least one node to receive the DC power through the common power bus. The system further includes means for transmitting a power information signal from the power supply through the common power bus, means for receiving the power information signal through the common power bus and for providing the received power information signal to the at least one node, and means for separating paths for high frequency and low frequency currents, and for providing high frequency insulation for the means for transmitting and the means for receiving from low impedance connections of the power supply and the at least one node to the common power bus.

Example 27 includes the system of Example 26, wherein the means for transmitting includes means for blocking DC power to or from the common power bus, and means for converting a first pulse having a first duration to a second pulse having a second duration. The second duration is less than the first duration. The system further includes means for reducing a peak power of the second pulse for transmission through the common power bus.

Example 28 includes the system of any of Examples 26-27, wherein the at least one receiver includes means for blocking DC power to or from the common power bus, means for detecting a pulse received through the common power bus, and means for extending a duration of the detected pulse received through the common power bus.

Example 29 includes the system of any of Examples 26-28, wherein the power information signal comprises an alert signal to indicate an input fault condition or a DC output fault condition, and wherein the at least one node is configured to throttle one or more components to reduce power consumption in response to the alert signal.

Example 30 includes a power system including means for reducing a pulse width of an alert signal received from a power supply module, means for providing the alert signal through a first capacitive coupled transformer to a power bus, means for receiving the alert signal through a second capacitive coupled transformer from the power bus, and means providing the received alert signal to a node powered through the power bus.

Example 31 includes the power system of Example 30, and further includes means for extending, before providing the received alert signal to the node, the pulse width duration of the received alert signal.

Example 32 includes the power system of any of Examples 30-31, and further includes means for throttling, in response to receiving the alert signal through the power bus, one or more components of the node.

Example 33 includes the power system of any of Examples 30-32, and further includes means for buffering a direct current (DC) power input of the node to separate paths for high frequency and low frequency currents through the power bus.

Example 34 is a method for communicating a power information signal through a low impedance power bus configured to provide power from a power supply unit to a node. The method includes blocking direct current (DC) signal to or from the power bus, and converting a first pulse having a first duration to a second pulse having a second duration. The second duration being less than the first duration. The method further includes reducing a peak power of the second pulse for transmission through the power bus.

Example 35 includes the method of Example 34, wherein the first duration is greater than 100 milliseconds, and wherein the second duration is less than 4 microseconds.

Example 36 is a system for rack level power protection and control. The system includes a shared power supply including one or more power sensors to measure at least one of input and output power, and a power data broadcast module to broadcast a common rack power cap level to a plurality of server nodes. The power data broadcast module further to broadcast a shared power feedback signal from the shared power supply to the plurality of server nodes. The system further includes a power controller to determine a power error based on a difference between the common rack power level and the shared power feedback signal, and to control, at each of the plurality of server nodes, a local power consumption based on the power error.

Example 37 includes the system of Example 36, and further includes an interrupt transmitter to transmit, from the shared power supply, the shared power data as serial data, and a power data buffer to store, at each of the plurality of server nodes, the shared power data received from the shared power supply. The power data buffer configured to be polled by the plurality of server nodes.

Example 38 includes the system of any of Examples 36-37, and further includes a fast interrupt module to monitor power information at the shared power supply, and to generate, based on the monitored power information, an interrupt signal. The system further includes an interrupt transmitter to transmit the interrupt signal from the shared power supply to the plurality of server nodes through a common power bus.

Example 39 includes the system of any of Examples 36-38, and further includes a plurality of receivers to receive, at the plurality of server nodes, the interrupt signal through the common power bus. The system further includes a plurality of processors, at the plurality of server nodes, to throttle, in response to the interrupt signal, the plurality of server nodes.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. A method to control power in a server rack with a shared power supply, the method comprising:
   broadcasting a common rack power cap level to a plurality of server nodes;
   broadcasting a shared power feedback signal from the shared power supply to the plurality of server nodes;
   determining, at each of the plurality of server nodes, a power error based on a difference between the common rack power cap level and the shared power feedback signal; and
   controlling, autonomously at each of the plurality of server nodes, a local power consumption based on the power error to maintain rack level power capping without another layer to manage the nodes in the rack through a reallocation process, wherein individual power consumption increases at the plurality of server nodes occur without the use of information provided by other layers.

2. The method of claim 1, further comprising operating the plurality of server nodes in parallel to maintain a rack power consumption level at or below the common rack power cap level.

3. The method of claim 1, further comprising broadcasting shared power data from the shared power supply to the plurality of server nodes, the shared power data comprising measured input and direct current (DC) shared power supply output power levels.

4. The method of claim 3, further comprising:
transmitting, from the shared power supply, the shared power data as serial data; and
storing, at each of the plurality of server nodes, the shared power data received from the shared power supply in a power data buffer comprising a register configured to be polled by the plurality of server nodes.

5. The method of claim 1, further comprising:
monitoring power information at the shared power supply;
based on the monitored power information, generating an interrupt signal; and
transmitting the interrupt signal from the shared power supply to the plurality of server nodes through a common power bus.

6. The method of claim 5, further comprising:
receiving, at the plurality of server nodes, the interrupt signal through the common power bus; and
in response to the interrupt signal, throttling the plurality of server nodes.

7. A non-transitory machine readable storage medium including machine-readable instructions, when executed by one or more processors, to:
broadcast a common rack power cap level to a plurality of server nodes;
broadcast a shared power feedback signal from the shared power supply to the plurality of server nodes;
determine, at each of the plurality of server nodes, a power error based on a difference between the common rack power cap level and the shared power feedback signal; and
control, autonomously at each of the plurality of server nodes, a local power consumption based on the power error to maintain rack level power capping without another layer to manage the nodes in the rack through a reallocation process, wherein individual power consumption increases at the plurality of server nodes occur without the use of information provided by other layers.

8. The non-transitory machine readable storage medium of claim 7, the machine-readable instructions further to operate the plurality of server nodes in parallel to maintain a rack power consumption level at or below the common rack power cap level.

9. The non-transitory machine readable storage medium of claim 7, the machine-readable instructions further to broadcast shared power data from the shared power supply to the plurality of server nodes, the shared power data comprising measured input and direct current (DC) shared power supply output power levels.

10. The non-transitory machine readable storage medium of claim 9, the machine-readable instructions further to:
transmit, from the shared power supply, the shared power data as serial data; and
store, at each of the plurality of server nodes, the shared power data received from the shared power supply in a power data buffer comprising a register configured to be polled by the plurality of server nodes.

11. The non-transitory machine readable storage medium of claim 7, the machine-readable instructions further to:
monitor power information at the shared power supply;
based on the monitored power information, generate an interrupt signal; and
transmit the interrupt signal from the shared power supply to the plurality of server nodes through a common power bus.

12. The non-transitory machine readable storage medium of claim 11, the machine-readable instructions further to:
receive, at the plurality of server nodes, the interrupt signal through the common power bus; and
in response to the interrupt signal, throttle the plurality of server nodes.

* * * * *